United States Patent [19]

Le

[11] Patent Number: 5,539,990
[45] Date of Patent: Jul. 30, 1996

[54] THREE-DIMENSIONAL OPTICAL LEVELLING, PLUMBING AND ANGLE-CALIBRATING INSTRUMENT

[76] Inventor: Mike Le, c/o Hung Hsing Patent Service Center P.O. Box 55–1670, Taipei, Taiwan

[21] Appl. No.: 453,169

[22] Filed: May 30, 1995

[51] Int. Cl.$^6$ .................................................. G01B 11/26
[52] U.S. Cl. .................. 33/283; 33/281; 33/286; 33/DIG. 21; 356/138
[58] Field of Search .................... 33/283, 281, 286, 33/291, DiG. 21, 282, 285, 276; 356/138, 149, 250

[56] References Cited

U.S. PATENT DOCUMENTS

| | | | |
|---|---|---|---|
| 3,964,824 | 6/1976 | Dixon | 356/138 |
| 4,471,530 | 9/1984 | Kirven | 33/286 |
| 4,836,669 | 6/1989 | Teach | 356/138 |
| 4,993,161 | 2/1991 | Borkovitz | 33/291 |
| 5,012,585 | 5/1991 | DiMaggio | 33/291 |
| 5,144,486 | 9/1992 | Hart | 356/138 |
| 5,184,406 | 2/1993 | Swierski | 33/291 |

Primary Examiner—Christopher W. Fulton

[57] ABSTRACT

An optical levelling, plumbing and angle-calibrating instrument includes: a frame; a plumb body universally pendulously mounted on the frame and defining a vertical plumb line gravitationally; at least an illuminator electrically connected to a power supply and mounted on the plumb body for emitting laser light; and at least a cylindrical-surfaced lens mounted on the plumb body in front of the illuminator for planarly diverging the laser light as emitted from the illuminator through the lens to form a laser light plane transverse to a lens axis of the cylindrical-surfaced lens, whereby the laser light plane will projectively intersect an objective wall to form a straight line of optical image, serving as a reference line for levelling or plumbing use.

5 Claims, 4 Drawing Sheets

5,539,990

THREE-DIMENSIONAL OPTICAL LEVELLING, PLUMBING AND ANGLE-CALIBRATING INSTRUMENT

BACKGROUND OF THE INVENTION

A conventional laser beam level instrument as disclosed in U.S. Pat. No. 4,993,161 includes a laser diode mounted on a pendulous platform suspended from a frame which moves freely under the influence of gravity to provide automatic self-levelling. A vertical laser beam emitted from the diode is deflected by a prism which is rotated as driven by a motor, thereby providing a levelling reference through a horizontal plane.

However, such an instrument requires a rotating mechanism such as driven by a motor and transmission belt which may cause the drawback of heavy weight, increased production cost and maintenance problems.

The present inventor has invented an optical levelling and plumbing instrument without the rotating mechanism.

SUMMARY OF THE INVENTION

The object of the present invention is to provide an optical levelling, plumbing and angle-calibrating instrument including: a frame; a plumb body universally pendulously mounted on the frame and defining a vertical plumb line gravitationally; at least an illuminator electrically connected to a power supply and mounted on the plumb body for emitting laser light; and at least a cylindrical-surfaced lens mounted on the plumb body in front of the illuminator for planarly diverging the laser light as emitted from the illuminator through the lens to form a laser light plane transverse to a lens axis of the cylindrical-surfaced lens, whereby the laser light plane will projectively intersect an objective wall to form a straight line of optical image, serving as a reference line for levelling or plumbing use.

DETAILED DESCRIPTION

Figure 1:
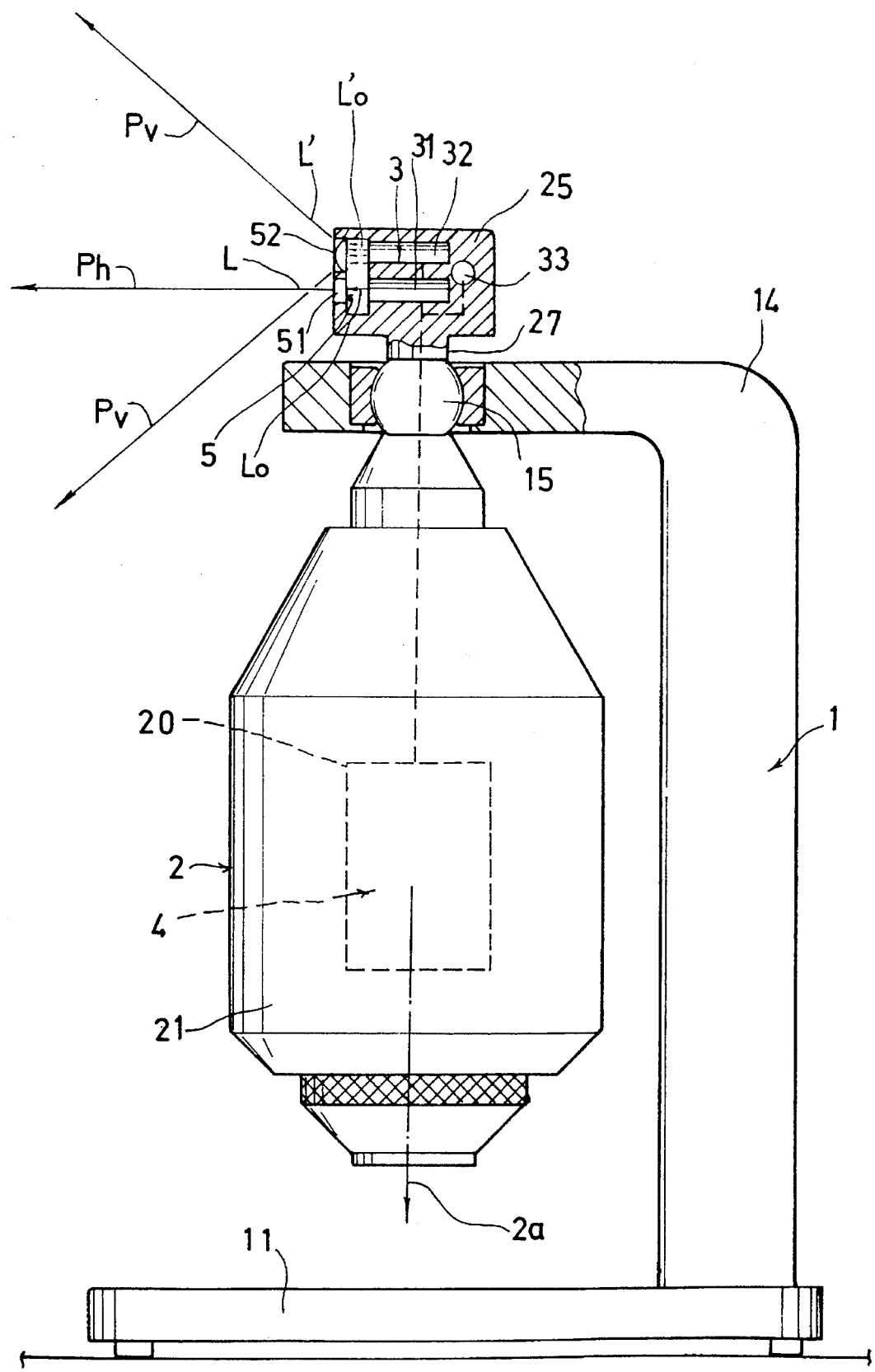
FIG. 1 is an elevational drawing of the present invention.
Figure 2:
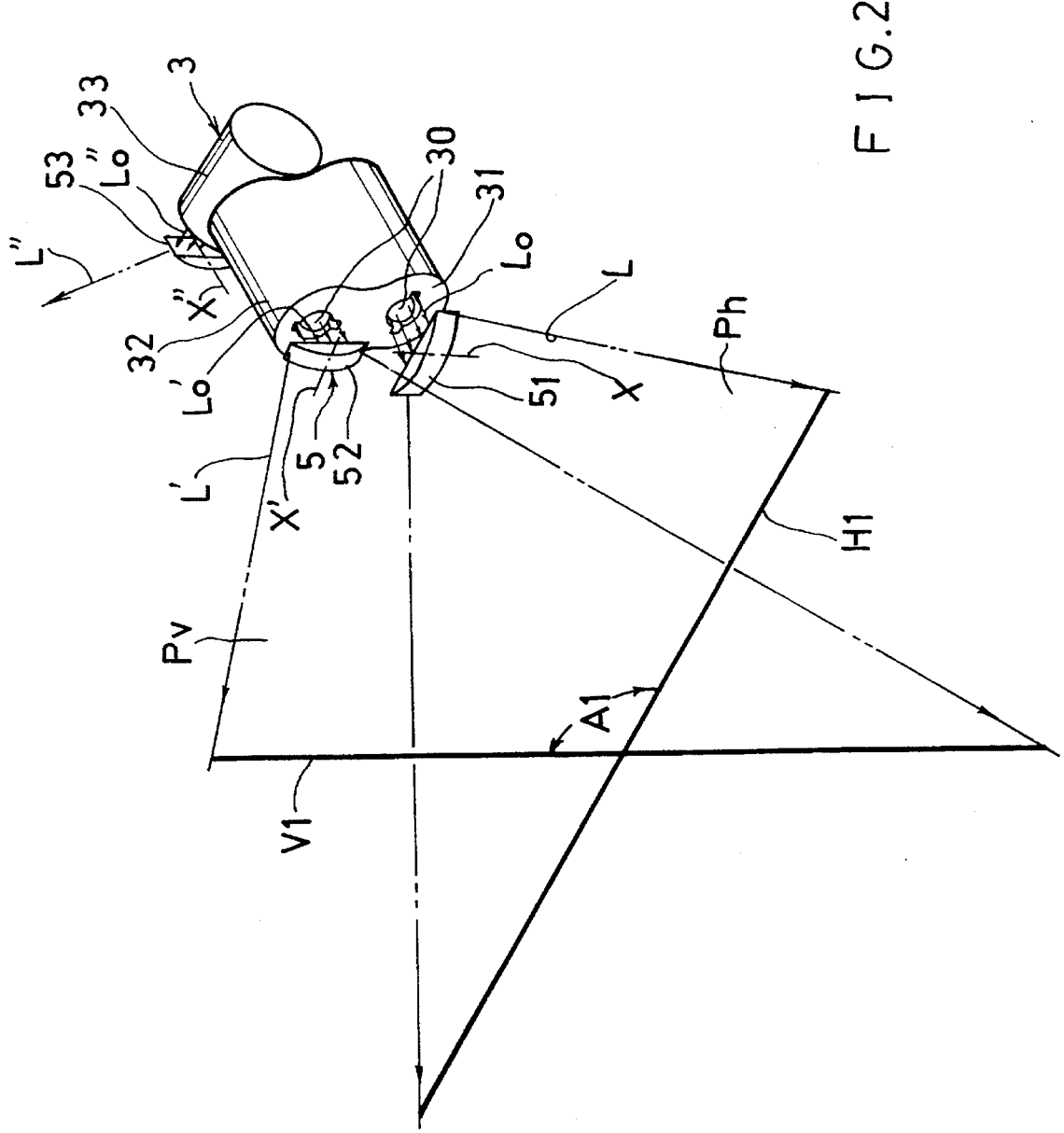
FIG. 2 is a partial perspective illustration showing the illuminators and the cylindrical-surfaced lens in accordance with the present invention.

As shown in FIGS. 1 and 2, the present invention comprises: a frame or housing 1, a plumb body 2 universally pendulously mounted on the frame 1, an illuminating means 3 secured on the plumb body 2 for emitting a parallel light beam, a power supply means 4 including a power source of batteries and a control means (not shown) for adjusting the power (such as voltage or current) supplied to the illuminating means 3 for adjusting the brightness of the optical images produced by the illuminating means 3, and a cylindrical-surfaced lens means 5 mounted on the plumb body 2 for magnifying or diverging the light beam as deflected through the cylindrical-surfaced lens means 5.

The power supply means 4 may be stored or mounted in the plumb body 2 or in the frame or housing 1, not limited in this invention.

Figure 4:
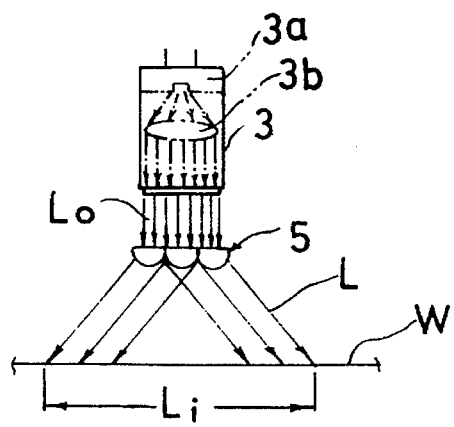
FIG. 4 is an illustration showing a plurality of cylindrical-surfaced lenses linearly connected in series for magnifying the optical image of the light beam.

The illuminating means 3 includes a plurality of illuminators 31, 32, 33 each illuminator electrically connected to the power supply means 4 and each illuminator comprising a light source such as a laser diode 3a and a collimating lens 3b as shown in FIG. 4 for producing parallel light (or laser) beam Lo as emitted from the light source 3a.

The illuminators 31, 32, 33 of the illuminating means 3 may be mounted on a holder portion 25 positioned on a top portion of the plumb body 2 as shown in FIG. 1 or the illuminators may be installed on other suitable positions of the plumb body 2, not limited in this invention.

The frame 1 includes a base 11 resting on a surface, a cantilever 14 protruding upwardly from the base 11 for universally securing a neck portion 27 of the plumb body 2 on the cantilever 14 by an universal swivel means 15 such as an universal coupling.

The frame 1 may be modified to be other shapes or structures, such as an envelope or closed housing (not shown) for shielding the plumb body 2 within the housing.

The plumb body 2 includes a battery chamber 20 recessed in the body 2 for storing a battery or batteries in the chamber 20, and a plumb portion 21 formed on a lower or middle portion of the body 2, with the plumb body 2 defining a vertical plumb line 2a aligned with a gravity center of the plumb body 2.

The illuminating means 3 includes: a first illuminator 31 for emitting a first parallel light beam Lo defining a horizontal plane projectively perpendicular to the vertical plumb line 2a of the plumb body 2, a second illuminator 32 juxtapositional to the first illuminator 31 for emitting a second parallel light beam Lo' defining a vertical plane projectively parallel to the vertical plumb line 2a, and a third illuminator 33 transverse to the first and second illuminators 31, 32 for emitting a third parallel light beam Lo" projectively perpendicular to the second light beam Lo' emitted from the second illuminator 32.

Figure 3:
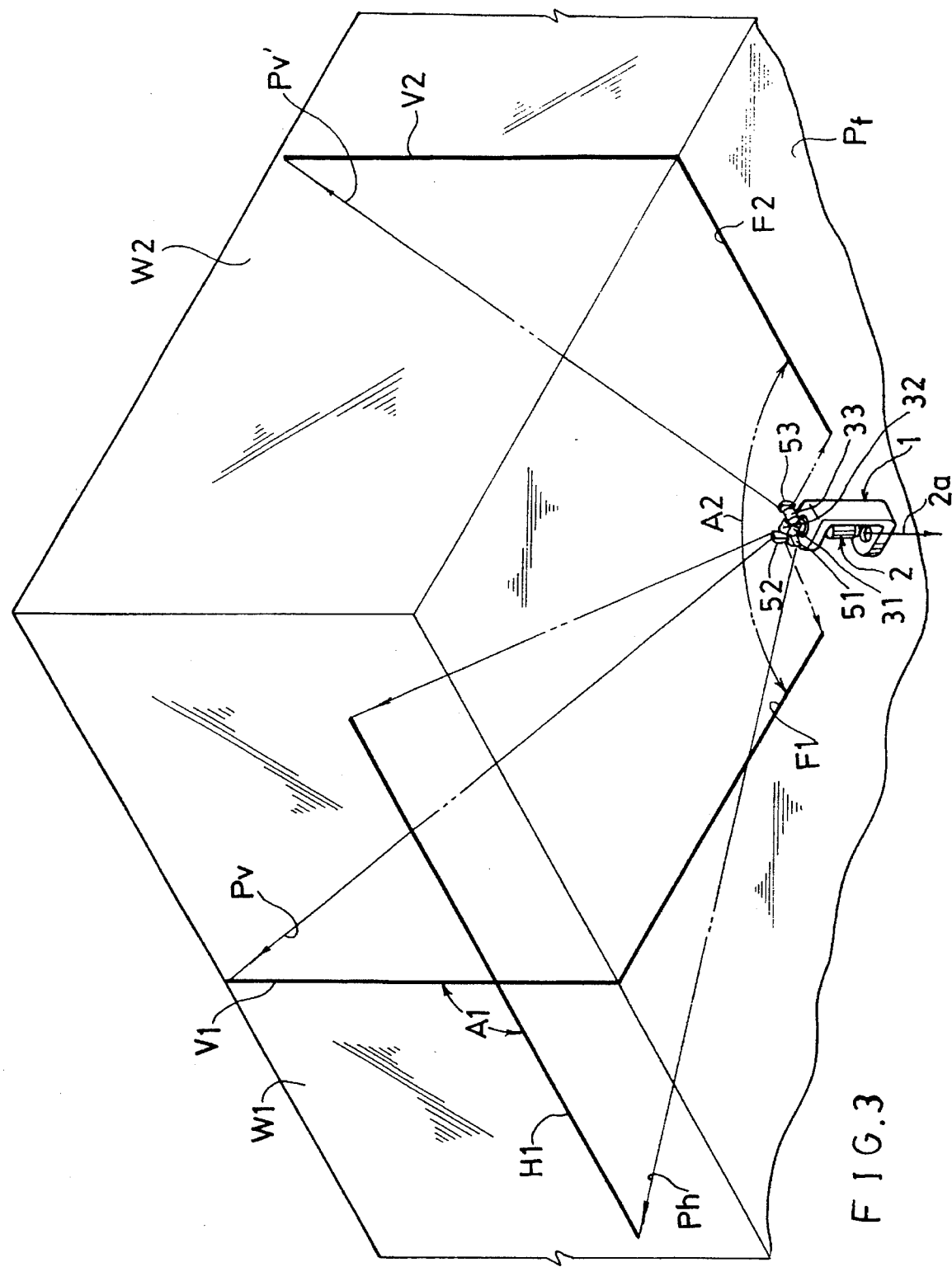
FIG. 3 is an illustration showing a three dimensional display of optical images of the light beams as emitted from the illuminators of the present invention.

The cylindrical-surfaced lens means 5 includes: a first cylindrical-surfaced lens 51 positioned in front of the first illuminator 31 and having a first lens axis X parallel to the vertical plumb line 2a of the plumb body 2 for planarly magnifying or diverging the first parallel light beam Lo passing through and deflected by the first cylindrical-surfaced lens 51 to be a first diverging laser light plane L for producing a first horizontal straight line of optical image H1 which may be projectively displayed on a first vertical wall W1 as shown in FIG. 3, a second cylindrical-surfaced lens 52 positioned in front of the second illuminator 32 and having a second lens axis X' projectively perpendicular to the first lens axis X of the first cylindrical-surfaced lens 51 for magnifying the second parallel light beam Lo' passing through and deflected by the second cylindrical-surfaced lens 52 to be a second laser plane L' for producing a first vertical straight line of optical image V1 which may be projectively displayed on the first vertical wall W1 to intersect the first horizontal straight line H1 to form a first right angle A1 of optical image, and a third cylindrical-surfaced lens 53 positioned in front of the third illuminator 33 and having a third lens axis X" projectively parallel to the second lens axis X' of the second cylindrical-surfaced lens 52 for magnifying the third parallel light beam Lo" passing through and deflected by the third cylindrical-surfaced lens 53 to be a third laser plane L" for producing a second vertical straight line V2 of optical image which may be projectively displayed on a second vertical wall W2 perpendicular to the first vertical wall W1.

The first vertical straight line V1 of optical image projectively intersects a horizontal base plane Pf to form a first base line F1 of optical image forming a first vertical plane Pv emerging from the light emitting point 30 of the second illuminator 32; while the second vertical straight line V2 of optical image projectively intersects the horizontal base plane Pf to form a second base line F2 of optical image forming a second vertical plane Pv' to define a second right angle A2 of optical image between the first and second vertical planes Pv, Pv', with the first horizontal straight line H1 forming a horizontal plane Ph perpendicular to the first vertical plane Pv as shown in FIG. 3. The two base lines F1, F2 will serve as references in surveying, construction or measurement for plumbing and angle calibration.

The second vertical plane Pv' may be separated from the first vertical plane Pv by another angle, other than 90 degrees. The horizontal line H1 and the vertical lines V1, V2 may serve for a direct optical-image referenece for levelling, plumbing and angle-calibrating purposes, without requiring any rotating mechanism such as a conventional driving motor. Therefore, the present invention provides an instrument for levelling, plumbing and angle calibration with a reliable precision, lower installation cost and minimized maintenance problem in comparison with conventional laser beam level instruments.

A plurality of cylindrical-surfaced lens 5 may be linearly connected in series as shown in FIG. 4 to magnify the optical image Li by projecting the light beam on a wall W as magnified and deflected through the lens 5.

Figure 5:
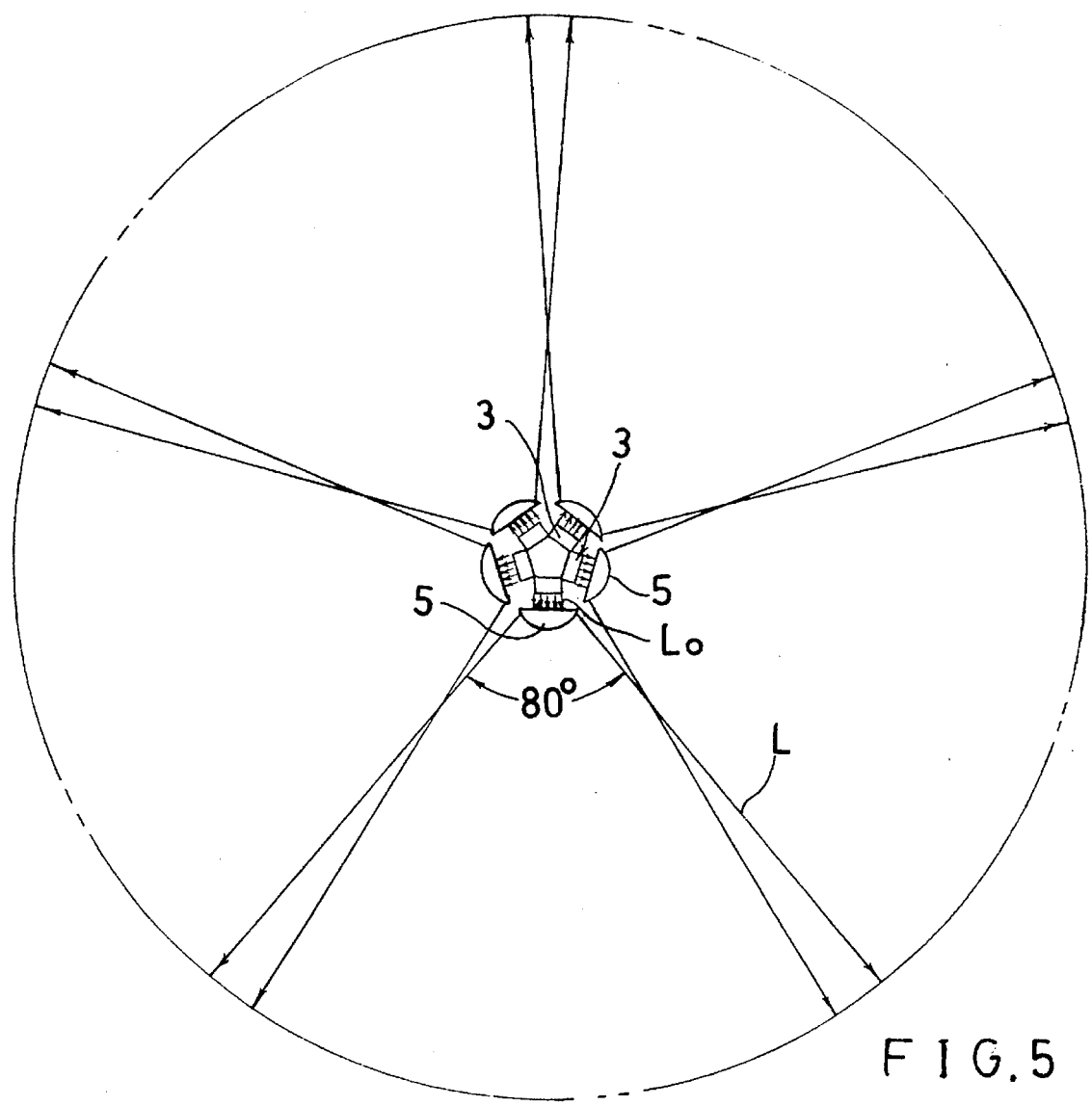
FIG. 5 shows a circular optical image of 360 degrees as effected by a plurality of lens and illuminators radially connected in series.

The plurality of cylindrical-surfaced lens 5 may be radially connected in series to form an optical image of 360 degrees, in which each lens may cover an angle of 80 degrees, thereby requiring five lenses 5 to form a circle as shown in FIG. 5.

The present invention may be modified without departing from the spirit and scope of this invention.

Figure 6:
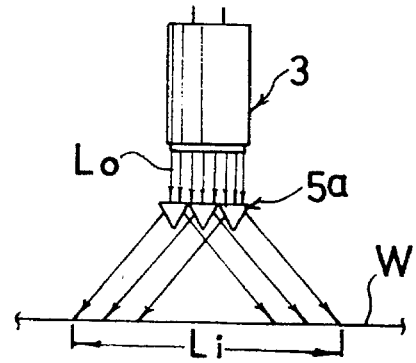
FIG. 6 is an illustration showing another preferred embodiment of the present invention.

As shown in FIG. 6, the cylindrical-surfaced lens 5 may be substituted with a plurality of prism lenses 5a connected in series for magnifying the laser light as emitted from the illuminator 3.

I claim:

1. An optical levelling, plumbing and angle-calibrating instrument comprising:

a frame;

a plumb body universally pendulously mounted on the frame and defining a vertical plumb line gravitationally;

an illuminating means electrically connected to a power supply means and mounted on the plumb body for emitting laser light; and a cylindrical-surfaced lens means mounted on said plumb body in front of said illuminating means and having a lens axis projectively perpendicular to the laser light emitted from said illuminating means for planarly diverging the laser light as emitted from said illuminating means through said lens means to form a laser light plane transverse to a lens axis of said cylindrical-surfaced lens means, said laser light plane projectively intersecting an objective wall to form an optical image line, said illuminating means and said lens means operatively projecting a first laser light plane projectively perpendicular to the vertical plumb line of the plumb body to intersect the objective wall to form a horizontal straight line of optical image for levelling; and said illuminating means and said lens means operatively projecting a second laser light plane projectively perpendicular to said first laser light plane to intersect the objective wall to form a vertical straight line for plumbing.

2. An optical levelling, plumbing and angle-calbrating instrument according to claim 1, wherein said power supply means includes at least a battery mounted in said plumb body.

3. An optical levelling, plumbing and angle-calbrating instrument according to claim 1, wherein said illuminating means includes: a first illuminator, a second illuminator juxtapositional to said first illuminator, and a third illuminator angularly deviated from said first illuminator and said second illuminator;

said cylindrical-surfaced lens means including a first cylindrical-surfaced lens having a first lens axis parallel to the vertical plumb line and positioned in front of said first illuminator for forming a horizontal laser light plane, a second cylindrical-surfaced lens having a second lens axis projectively perpendicular to said first lens axis and positioned in front of said second illuminator for forming a first vertical laser light plane, and a third cylindrical-surfaced lens having a third lens axis projectively perpendicular to said second lens axis and positioned in front of said third illuminator for forming a second vertical laser light plane deviated from said first vertical laser light plane with an angle.

4. An optical levelling, plumbing and angle-calibrating instrument according to claim 3, wherein said third cylindrical-surfaced lens is separated from said second cylindrical-surfaced lens with a right angle to define a right angle between said second vertical laser light plane and said first vertical laser light plane.

5. An optical levelling, plumbing and angle-calibrating instrument according to claim 1, wherein said cylindrical-surfaced lens means includes: a plurality of cylindrical-surfaced lenses linearly connected in series to allow a lens axis of each said cylindrical-surfaced lens to be projectively perpendicular to the laser light emitted from said illuminating means, said lenses positioned in front of said illuminating means to planarly diverge the laser light to form a laser plane projectively intersecting an objective wall to form a continuous optical image line on the wall.

* * * * *

US005539990C1

(12) EX PARTE REEXAMINATION CERTIFICATE (10842nd)
United States Patent
Le

(10) Number: US 5,539,990 C1
(45) Certificate Issued: Apr. 4, 2016

(54) THREE-DIMENSIONAL OPTICAL LEVELLING, PLUMBING AND ANGLE-CALIBRATING INSTRUMENT

(75) Inventor: Mike Le, Taipei (TW)

(73) Assignees: Jing Lei Tech Co., Ltd.; Guan Yu Lai

Reexamination Request:
No. 90/012,222, Mar. 30, 2012

Reexamination Certificate for:
Patent No.: 5,539,990
Issued: Jul. 30, 1996
Appl. No.: 08/453,169
Filed: May 30, 1995

(51) Int. Cl.
G01C 15/00 (2006.01)
(52) U.S. Cl.
CPC .................. G01C 15/004 (2013.01)
(58) Field of Classification Search
None
See application file for complete search history.

(56) References Cited

To view the complete listing of prior art documents cited during the proceeding for Reexamination Control Number 90/012,222, please refer to the USPTO's public Patent Application Information Retrieval (PAIR) system under the Display References tab.

Primary Examiner — William Doerrler

(57) ABSTRACT

An optical levelling, plumbing and angle-calibrating instrument includes: a frame; a plumb body universally pendulously mounted on the frame and defining a vertical plumb line gravitationally; at least an illuminator electrically connected to a power supply and mounted on the plumb body for emitting laser light; and at least a cylindrical-surfaced lens mounted on the plumb body in front of the illuminator for planarly diverging the laser light as emitted from the illuminator through the lens to form a laser light plane transverse to a lens axis of the cylindrical-surfaced lens, whereby the laser light plane will projectively intersect an objective wall to form a straight line of optical image, serving as a reference line for levelling or plumbing use.

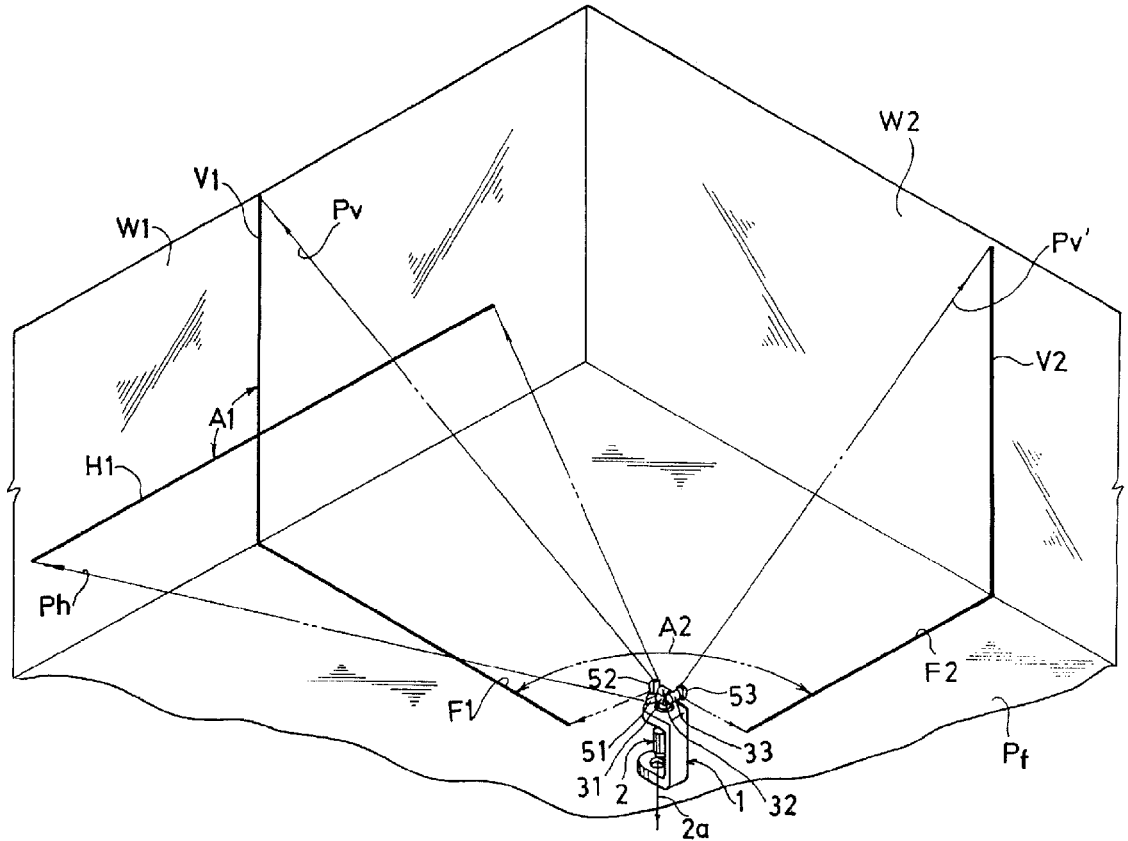

EX PARTE
REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claim 5 is confirmed.

Claims 1-4 are cancelled.

\* \* \* \* \*